March 31, 1964     R. W. JENSEN     3,126,947
CABIN TEMPERATURE CONTROL SYSTEM
Original Filed June 17, 1955     2 Sheets-Sheet 1

Fig. 1.

RAYMOND W. JENSEN,
INVENTOR.
WHANN & McMANIGAL
Attorneys for Applicant

March 31, 1964 R. W. JENSEN 3,126,947
CABIN TEMPERATURE CONTROL SYSTEM
Original Filed June 17, 1955 2 Sheets-Sheet 2

RAYMOND W. JENSEN,
INVENTOR.
WHANN & McMANIGAL
Attorneys for Applicant

United States Patent Office 3,126,947
Patented Mar. 31, 1964

3,126,947
CABIN TEMPERATURE CONTROL SYSTEM
Raymond W. Jensen, Los Angeles, Calif., assignor to The Garrett Corporation, Los Angeles, Calif., a corporation of California
Continuation of application Ser. No. 516,173, June 17, 1955. This application May 21, 1959, Ser. No. 814,766
27 Claims. (Cl. 165—26)

This invention relates generally to fluid conditioning systems and relates more particularly to air conditioning and temperature control apparatus for enclosures.

This application is a continuation of applicant's copending application, Serial No. 516,173, for Cabin Temperature Control System filed June 17, 1955 and now abandoned.

While the invention has particular utility in connection with air conditioning apparatus for enclosures such as, for example, aircraft cabins, or other such enclosures, and is disclosed herein as embodied in such apparatus, it is to be understood that its utility is not confined thereto.

Under certain operating conditions, it is highly desirable, and more or less essential, that the cabins or cockpits of aircraft be supplied with properly conditioned air. For example, as a general rule cooling or refrigeration is required only from sea level up to an altitude of approximately 15,000 feet above sea level, such a conditioning of the air being especially desirable when the aircraft is flying in tropical conditions of relatively high temperatures and humidity. Various systems have been proposed for carrying out the air refrigerating and circulating process. In the case of a turbine-powered aircraft, compressed air is bled off from the main compressor for cabin ventilation and/or pressurization purposes. In the case of a reciprocating-engine-powered aircraft, an auxiliary cabin supercharger is driven by the engine and furnishes such cabin air. In either case, the air is relatively hot and compressed to a pressure somewhat above that necessary for the purpose, and in such cases it is common to provide means for cooling or refrigerating the air and reducing its pressure to a useful level. The present invention is largely concerned with aircraft in which a suitable source of compressed air is available, the air being delivered through a duct for cabin or cockpit ventilation and/or pressurization purposes.

It is therefore an object of the invention to provide a system or apparatus which will meet various operating conditions to provide proper temperature and pressure conditions within the enclosure.

Another object of the invention is to provide apparatus of this character wherein cabin air is directly sensed for providing the proper control.

Still another object of the invention is to provide apparatus of this character which provides an automatic control of the conditions desired within the enclosure.

A further object of the invention is to provide apparatus of this character having a manual control.

A still further object of the invention is to provide apparatus of this character which may be quickly and easily set or adjusted for the conditions desired.

Another object of the invention is to provide apparatus of this character that is compact and sturdy.

Still another object of the invention is to provide apparatus of this character that is effective and reliable in operation.

The characteristics and advantages of the invention are further sufficiently referred to in connection with the following detailed description of the accompanying drawings which represent one embodiment. After considering this example, skilled persons will understand that many variations may be made without departing from the principles and I, contemplate the employment of any structures, arrangements, or modes of operation that are properly within the scope of the appended claims.

Referring to the drawings:

FIG. 1A is a schematic view of another portion of said system.

Figure 1:
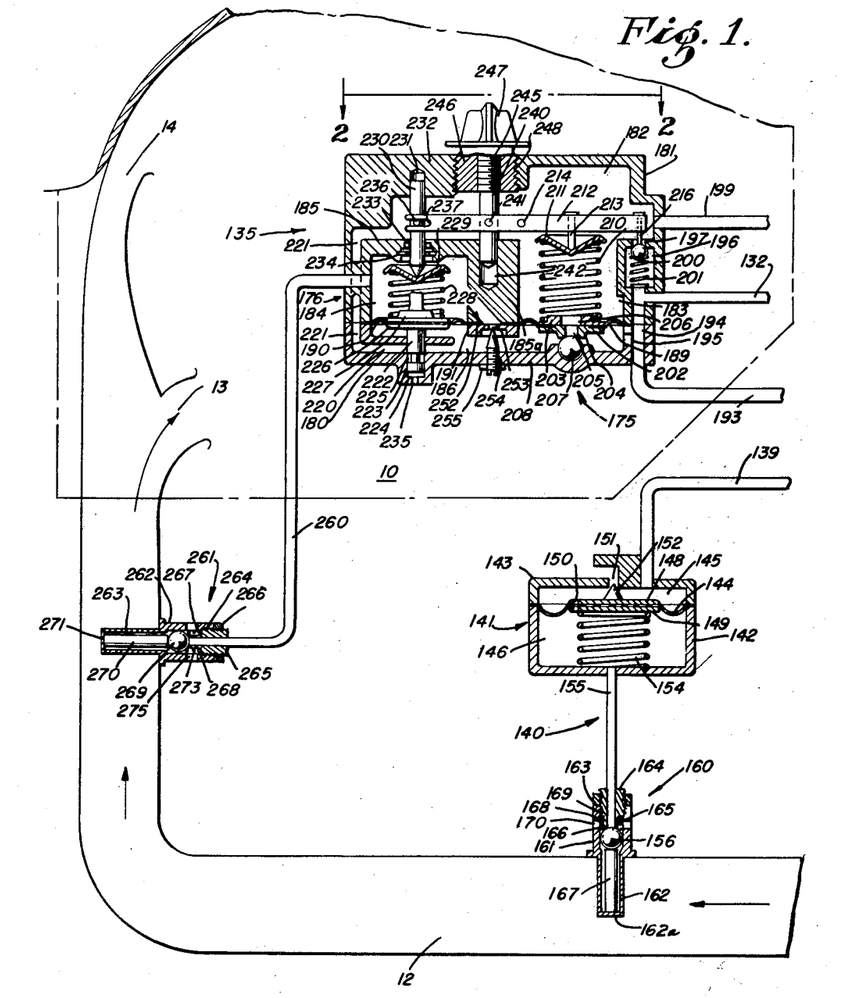
FIG. 1 is a schematic view of a portion of the system showing the apparatus embodying the present invention.

Referring more particularly to the drawings there is shown an aircraft cabin, indicated generally at 10 which is supplied by suitable means (not shown) with air at a suitable predetermined temperature and pressure to provide refrigeration and circulation or ventilation of the cabin, escape of air being controlled by any suitable well known pressure regulating or outflow valve mechanism, not shown. One type of such pressure regulating mechanism is disclosed in the patent to Kemper No. 2,463,491. Other types of outflow valve mechanisms that might be used are disclosed in the Arthur, et al. Patent No. 2,531,100, and the Fischer Patent No. 2,672,085.

In the case of aircraft driven by turbines, compressed air is bled off from the main compressor thereof for cabin ventilation and/or for pressurization purposes. In the case of aircraft powered by reciprocating engines, an auxiliary supercharger may be provided, said supercharger being driven by an engine. In either case, the air is relatively hot and compressed to a pressure somewhat above that suitable for the purpose. This air at relatively high pressure and temperature is delivered to conduit 11 which is connected to a main conduit 12 delivering air to the cabin outlets 13 and 14.

The air delivered by way of the conduit 11 is usually of a temperature higher than is required so that it is necessary to provide means for cooling or refrigerating said air and reducing its temperature and pressure to a usable level. Conduit 11 is connected to an intercooler or heat exchanger 16 and high pressure air from the conduit 11 is delivered to said intercooler 16, and traverses the passes 17 thereof. From the intercooler this air passes to a cooling turbine 18 by way of a passage 22, and is discharged from the turbine into conduit 23 which leads into conduit 12. Thus the heated air from conduit 11 is cooled by the intercooler and the turbine. The system also includes a hot air bypass 24 around the intercooler and turbine.

A supply of cooling air is derived from a ram air inlet 25 connected to a conduit 26 which is connected to the coolant passes of the intercooler 16. There is a connection 27, with a fan 28, which is driven through a shaft 29 by the turbine 18, and which aids in drawing ram air through the intercooler for cooling the heated air from conduit 11 which passes through said intercooler. Air is discharged from the fan by way of a discharge conduit 30 leading to any suitable region, such as ambient atmosphere, for disposal of the discharge air. There is also a ram air bypass conduit 31 connecting the conduit 26 with the bypass 24 whereby the relatively cold low pressure ram air may bypass the turbine and intercooler. Bypass 24 and bypass 31 have a common portion 32 which leads to the conduit 12.

Various controls are provided in the system and these include a ram air valve mechanism, indicated generally at 35, a bleed shut off valve mechanism, indicated generally at 36, and a bypass valve mechanism which is indicated generally at 37.

The ram air valve mechanism 35, which may be termed ram air bypass valve means, includes a butterfly valve 38 located in the cool air bypass conduit 31 for controlling the flow of air through said conduit. Valve 38 is attached to a rotatable valve shaft 39 which extends through a wall of the conduit 31 and which carries an actuating lever 40. Means for controlling the valve 38 comprises a pressure responsive device, indicated generally at 41. Device 41 comprises a hollow casing 42 secured to any suitable fixed support by, for example, a bracket or web 43 or the like. There is a shallow cup like casing member or cap 44, and a flexible diaphragm 45 is marginally clamped between said casing member 42 and the cap 44. The central portion of the diaphragm 45 is clamped between a pair of plates 46 of well known character and one of the plates carries a rod 47 having a clevis 48 adjacent its free end. The clevis 48 is pivotally connected to the lever 40 adjacent the free end thereof. It is to be noted that the bottom of the casing 42 is provided with a large opening 50 through which the rod 47 extends. This opening is of substantial size and provides free communication between the interior of the casing 42 and atmosphere. A spring 51 is located within the casing 42 and reacts between the bottom wall of the casing and the adjacent plate 46 to thereby urge the diaphragm in a direction to normally effect opening of the valve 38. The opposite side of the diaphragm is subjected to the pressure in a chamber 52 defined by said diaphragm and the cap 44. Pressure in the chamber 51 urges the diaphragm in a direction to move the valve 38 in the closing direction.

The bleed air shut off valve means 36 comprises a butterfly valve 60 located in the conduit 11 upstream of its junction with the bypass conduit 24. Valve 60 is carried on a rotatable valve shaft 61 which has an end portion extending outwardly of the conduit 11, said end portion carrying an actuating lever 62. The valve 60 is controlled by a pressure responsive device which is indicated generally at 63. Device 63 comprises a casing 64 which is fixed, said casing being shown as formed integrally with a section of the conduit 11 although it is to be understood that said casing may be mounted to any suitable fixed support by any other suitable means. A cap 65 is provided and there is a flexible diaphragm 66 which is marginally clamped between the casing 64 and the cap 65. A central region or portion of the diaphragm 66 is clamped between plates 67 of the usual well known character. One of the plates 67 carries a rod 68 which extends through an opening 69 in the bottom wall of the casing 64. The rod 68 carries a clevis 70 which is pivotally connected to the lever 62 adjacent the free end thereof. Opening 69 is relatively large to permit free operative movements of the rod 68 and also to provide a free connection between the interior of the casing 64 and ambient atmosphere. Cap 65 is provided with a recess and defines with said diaphragm 66, a pressure chamber 71. Chamber 71 is connected to a source of high pressure air which is shown as being the conduit 11 upstream of the valve 60. This connection comprises a passage 72 in an extension 73 of the cap and between the passage 72 and the chamber 71 is a restricted orifice 74.

The bypass valve means 37, which may be termed the hot air bypass valve means, includes a valve, shown as a butterfly valve 80, located in the hot air bypass conduit 24 between the junction of the conduit 24 with the conduit 11, and the junction of the conduit 31 with the conduit 24. Valve 80 is mounted on a valve shaft 81 which has an end portion extending outwardly of the conduit 24 and which carries an actuating lever 82.

Pressure responsive means, indicated generally at 83, is provided to control the movements of said valve 80, said pressure responsive means comprising a hollow casing member 84 and a second hollow casing member 85. A pressure responsive flexible diaphragm 86 is marginally clamped between the casing members 84 and 85, and the central region of said diaphragm 86 is clamped between a pair of plates 88 and 89 which are secured together by rivets or any other suitable means. A rod 90 has one end secured to plate 88, the opposite end of said rod being operably secured to the lever 82 by means of a pin and slot connection 91. A spring 92 is located within the casing member 84 and reacts between the bottom of said casing member and plate 88 to normally urge the diaphragm in a direction to effect closing movement of the valve 80. The interior of casing member 84 is vented to atmosphere by means of a vent opening 94.

The casing member 85 has a reduced diameter portion 95, there being a transverse partition 96 spaced inwardly from the upper end of said portion 95. The casing member 95, partition 96 and diaphragm 86 define a pressure chamber 98 to which the upper side of diaphragm 86 is exposed. Pressure in the chamber 98 urges the diaphragm 86 in a direction to effect opening movement of the valve 80.

The outer end of the mechanism 37 comprises a metering valve mechanism which is indicated generally at 99. The mechanism 99 includes a cover 100 having a hollow portion and an extension 101 arranged axially of the mechanism. A diaphragm 102, having a smaller effective area than diaphragm 86, is marginally clamped between the outer end of the reduced diameter portion 95 of the casing member 85 and the cover 100. Thus, a pressure chamber 103, is provided on the underside of the diaphragm 102 and a chamber 104 is provided on the opposite side of said diaphragm, there being an atmospheric vent 105 for said chamber 104. A pair of plates 106 and 107 are provided on opposite sides of diaphragm 102 and clamp a central area of said diaphragm therebetween. Any suitable means, such as rivets or the like, may be used to secure the plates together.

The extension 101 is provided with an axial bore 108 which extends from the chamber 104 and is closed at the outer end by a wall 109. Intermediate the ends of the bore 108 the extension 101 is provided with oppositely extending cross bores 110 and 111 which communicate with said bore 108. Within the bore 108 is slidably mounted a movable valve member 112 which has a reduced diameter portion 113. The lower end of the valve 112 secured to the plate 106 so that said valve will be actuated by movements of the diaphragm 102. Plate 107 is provided with a depending rod or guide 114 which extends through an opening provided therefor in the partition 96. The lower end of rod 114 extends into the chamber 98 and is provided with a pin 115 adjacent its lower end for reception of one end of a spring 116. Spring 116 has its opposite end connected to an ear 117 on the plate 89 of the diaphragm 86. A vent 118 in the wall 109 prevents undesirable pressure within the outer end of bore 108 so that the valve 112 will not be subject to pressure which might interfere with the proper function thereof. It is to be noted that the chamber 98 is also provided with a small bleed 120 in the wall of the casing member 85.

Pressure for operating the hereinabove described mechanism is derived from the conduit 11 and, as pointed out above, said pressure is tranmsitted to the chamber 71. This chamber has a connection 130 with branches 131 and 132. Branch passage 131 leads to the chamber 52 of the mechanism 35 and branch passage 132 leads to a control device, indicated generally at 135, said device being more particularly described hereinafter.

A conduit 137 leads from the conduit 11 between valves 60 and 80 to the passage 111 in the extension 101. Passage 110 in said extension is connected with a conduit 138 which in turn is connected with a conduit 139. The latter has one end connected to the chamber 98 and the opposite end connected with a pneumatic high limit thermostat control mechanism, indicated generally at 140. This mechanism includes the pressure responsive rate of temperature change control device, indicated generally at 141, said device having a pair of hollow casing members 142 and 143 respectively, between which is marginally clamped a pressure responsive element or diaphragm 144. The diaphragm and casing members define chambers 145 and 146, respectively, the conduit 139 being connected with said chamber 145. A central region of the diaphragm 144 is clamped between a pair of plates 148 and 149 disposed on opposite sides of said diaphraghm and secured together by any suitable well known means such as rivets or the like, not shown. There is a bleed passage 150 through the diaphragm 144 and plates 148 and 149 which connects the chambers 145 and 146. Chamber 145 has an outlet 151 of fixed size leading to atmosphere, said outlet being controlled by a movable valve member 152 secured to the plate 148 so that said outlet 151 is controlled by the diaphragm 144. It is to be noted that pressure in the chamber 145 acts on the diaphragm 144 to urge said diaphragm in the valve opening direction. A spring 154 is located in chamber 146 and is effective to urge the diaphragm 144 in the valve closing direction.

Chamber 146 is also provided with an atmospheric outlet connection or conduit 155 which is controlled by a ball valve 156 of the high limit temperature responsive device or thermostatic device, indicated generally at 160. The temperature responsive device or thermostatic device 160 includes a tubular casing 161 which has a reduced diameter portion 162 extending into the conduit 12. The casing 161 has an outer end portion which is internally threaded at 163 for reception of an externally threaded plug 164 having an axial bore therethrough for reception of the outlet end portion of conduit 155. Plug 164 has a reduced diameter portion 165 at the inner end and the outlet end of conduit 155 terminates at the free end of said reduced diameter portion 165. The plug 164 and casing 161 define a chamber 166 in which is operably received the ball valve 156. Within the extension 162 is a thermostatic bar 167 which has its inner end resting on the bottom wall 162a of the extension 162. Bar 167 has a different co-efficient of expansion than the extension 162. More particularly, the bar 167 comprises the low expansion element and the extension 162 comprises the high expansion element of the thermostatic device. The ball 156 is urged against the outer end of the bar 167 by a spring 168 which reacts between a shoulder 169 of said plug 164 and said ball valve. The casing 161 has cross bores 170 connecting the chamber 166 with ambient atmosphere so that when ball valve 156 is unseated from the adjacent end of the reduced diameter portion 165 and conduit 155 air may pass from the conduit 155, through chamber 166 and cross bores 170, into the surrounding atmosphere. With this arrangement, the thermostatic device is subjected and responsive to the temperature of the air flow through conduit 12. The arrangement is such that as the temperature increases the ball valve 156 unseats, and upon decreasing temperature the valve 156 moves in the closing direction. The mechanism 141 provides means for limting the rate of temperature change at which the temperature control device 160 controls the bypass valve mechanism.

The control device or cabin controller 135 includes manual control means, indicated generally at 175, and automatic control means 176 and comprises a housing having a lower casing portion 180 and an upper casing portion 181, said casing portions being secured together by any suitable means such as, screws, not shown. The housing defined by the casing portions 180 and 181 has hollow portions. One of the hollow portions comprises a chamber 182 within the casing portion 181 and a generally vertical chamber 183 communicating with chamber 182. Casing portion 181 also includes a chamber 184 substantially parallel to chamber 183 and separated from chambers 182 and 183 by walls 185 and 185a, respectively. Casing portion 180 is provided with a chamber 186 and between the adjacent wall portions of said casing portions 180 and 181 are marginally clamped diaphragms 189 and 190, there being a central wall 191 for the lower casing portion which cooperated with wall 185a to marginally clamp certain portions of the diaphragms 189 and 190.

Chamber 103 of the bypass valve mechanism 37 is connected with chamber 186 by means of a conduit 193, passage 194 and passage 195, said passages being formed in the side wall of the casing portion 180. Passage 194 continues into the side wall of the casing portion 181 and terminates in a chamber 196 which has a connection 197 with chamber 182. It is to be noted that conduit 132 is also in communication with passage 194. Chamber 182 is connected to ambient atmosphere by means of a conduit 199. Within chamber 196 is a ball valve 200 which controls the connection or port 197 and is urged in the closing direction by a spring 201 which reacts between said ball valve 200 and the bottom wall of the chamber 196, said ball valve being a dump valve.

The manual control means 175 includes diaphragm 189, which may be termed the manual control relay diaphragm, said diaphragm having a central area clamped between a plate 202 and a spring retainer 203. Plate 202 has a central boss 204 with an opening 205 therethrough which communicates with chamber 183 by means of an opening 206 in the spring retainer 203. Thus the chamber 186 may be connected with the chamber 183. However, the passage 205 in the plate 202 is controlled by a ball valve 207 suitably secured in a recess provided therefor in the bottom wall 208 of the casing portion 180. The diaphragm 189 is urged downwardly so that ball valve member 207 will close the passages 205, 206 by means of a spring 210 disposed in chamber 183. Spring 210 reacts between the spring retainer 203 and a spring retainer 211 connected to a lever 212, located in chamber 182, by means of a pin 213, said lever being pivoted on a fixed pivot 214 located intermediate the ends thereof. Lever 212 extends beyond the pin 213 and said lever is provided, adjacent its free end, with a pin 216 adapted to engage the dump valve member 200 and move said dump valve member away from the passage 197 to thereby effect communication between chambers 196 and 182 upon clockwise rotation of said lever 212.

Chamber 186 has a second connection with the chamber 182, said second connection comprising passages 220 and 221. This connection is controlled by the automatic control means or temperature control relay, which includes a slide valve 222 extending through the passage 220 and having its lower end slidably received in a bore 223 in boss 224 of the bottom wall 208 of casing portion 180. The valve member 222 is provided with an annular groove 225 which, when in register with passage 220, permits air flow through said passage. Control of valve member 222 is effected by the automatic control means diaphragm 190, which forms a part of the automatic control of the controller mechanism, said valve member 222 having a plate 226 at its upper end and a central portion of the diaphragm 190 is clamped between said plate and a spring retainer 227. Diaphragm 190 is urged downwardly in the valve closing direction by a spring 228 which reacts between said spring retainer 227 and a spring retainer 229. Spring retainer 229 is in the general shape of an inverted cone and receives the lower conical end portion of a rod 230 slidable in a bore provided therefor in the wall 185 and also slidable in a bore 231 in the top wall 232 of the casing portion 181. The fit of the rod 230 in the bore 231 is sufficiently loose to prevent undesirable pressures in the upper end of said bore such as might interfere with the proper movements of said rod. However, a seal 233 is provided in the wall 185 to prevent air bypassing said rod between chambers 184 and 182. The seal 233 is secured in position by any suitable means such as a snap ring 234. It is to be noted that the lower end of bore 223 is provided with a relief port 235 to prevent undesirable pressures beneath the valve member 222.

Rod 230 is connected to adjacent end of lever 212 by means of a cross pin 236 received in a notch 237 in the adjacent end of said lever. It is to be noted that the rod 230 is at the opposite end of lever 212 from the end carrying the pin 216 for actuation of the dump valve 200. Between the pivot 214 and the notched end of lever 212 said lever has a connection with an adjustment rod 240 said connection comprising a pivot pin 241. Adjustment rod 240 has its lower end slidably received in a bore 242 in wall 185a, the fit of rod 240 in bore 242 being sufficiently loose to permit air to bypass said rod and prevent undesirable pressures in the lower portion of said bore. The upper end of rod 240 is enlarged and threaded at 245 and said threaded end is threadably received in an internally threaded bore provided therefor in the body portion 246 of an adjusting knob 247. The body 246 of knob 247 is externally threaded and screwed in an internally threaded opening 248 of the wall 232. Knob 247 is provided with a pointer 250 adapted to cooperate with a dial 251, FIG. 2 and rotation of knob 247 effects operative movement of the lever 212 as will be more fully described hereinafter.

Chamber 186 is connected with chamber 184 by means of a passage 252 in wall 185 and port 253 in wall 191, said port communicating with said passage 252. A temperature trim adjustment comprises a needle valve 254 screw threaded into a tapped opening provided therefor in the wall 208. The needle valve 254 has a tapered or conical end which cooperates with the port 253 to adjust the effective size of said port. A lock nut 255 is provided on the needle valve 254 to secure said valve in adjusted positions.

Chamber 184 is provided with a controlled connection with ambient atmosphere, said connection including a conduit 260 connected with temperature responsive device or thermostat indicated generally at 261. The temperature responsive device 261 is shown as being responsive to duct temperature and includes a tubular casing 262 which has a reduced diameter portion 263 extending into the conduit 12. Casing 262 has an outer end portion which is internally threaded at 264 for reception of an externally threaded plug 265 having an axial bore thereto in which is received the outlet end portion of conduit 260 and a lock nut 266 is provided on the plug 265 for securing same in the casing 262. Plug 265 has a reduced diameter portion 267 at the inner end and the outlet end of conduit 260 terminates at the free end of said reduced diameter portion 267. The plug 265 and casing 262 define a chamber 268 in which is operably received a ball valve 269. Within the extension 263 is a thermostatic bar 270 which has its inner end resting on the bottom wall 271 of said extension 263. Bar 270 has a different coefficient of expansion than extension 263. More particularly the bar 270 is the low expansion element and the extension comprises the high expansion element. A spring 273 is disposed about the reduced diameter portion 267 and reacts between a shoulder at the base of said reduced diameter portion and the ball valve 269 to urge said ball valve against the adjacent end of bar 270. Ball valve 269 controls the outlet of conduit 260 and air may escape from said conduit outlet into the chamber 268 when said ball valve is unseated from said conduit outlet. Cross bores 275 permit air to pass from said chamber 268 to ambient atmosphere. With this arrangemen the ball valve moves in the opening direction as the temperature increases and moves in the closing direction with decreasing temperature.

While the thermostat 261 is shown located in the conduit 12 it is to be understood that it may be located within the cabin.

The control mechanism 135 serves as the main enclosure temperature and air conditioning control. The main shut off valve mechanism 36 and the ram air valve mechanism 35 are connected together by conduit 131 which also is connected to the control mechanism 135.

In describing the operation of the mechanism the first position considered will be that of "ram air only." When the pointer 250 of the knob 247 is positioned at the "ram air only" point the lever 212 is in such a position that the dump valve 200 is open. At this time port 205 is closed by the valve member 207 and the passage 220 is closed off by the valve member 222. The pressure in the chambers 52 and 71 of the pressure responsive devices 41 and 63, respectively, is low because the dump valve 200 is open and the pressure in the control system is bled to atmosphere through the chamber 182 and the conduit 199. With this condition prevailing the pressure system which controls the ram air valve mechanism 35 and the bleed valve shut off mechanism 36 the valves 38 and 60 are in their normally open and normally closed positions, respectively.

Figure 2:
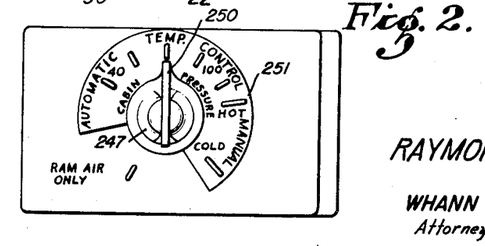
FIG. 2 is a front view of the control setting mechanism, as seen from line 2—2 of FIG. 1, showing the control knob and dial.

By turning the knob 247 in the clockwise direction, FIG. 2, the pointer 250 is moved to the beginning of "the cabin pressure on" and the "automatic temperature control" which beginning point may be any suitable temperature value but a temperature of 40° is indicated by way of example. The above referred to rotation of the knob 247 causes the lever 212 to move in the counterlockwise direction and effect closing of the dump valve. This closing of the dump valve causes a pressure build-up in the pressure lines controlling the ram air valve mechanism 35 and the bleed air shut off valve 36 and effects closing of the valve 38 of the mechanism 35 and effects opening of the shut off valve 60 of the main shut off valve mechanism 36, thus allowing air to enter the air conditioning system. At this time the bypass valve 80 of the bypass valve mechanism 37 is normally closed and all of the air entering the system passes through the heat exchanger 16 and the refrigeration turbine 18.

Air under pressure for actuating the various control devices controlled by the control mechanism 135 enters the controller system through the orifice 74. Control of the pressure of the controller system is effected by the control mechanism 135 and with the setting above described the manual valve mechanism 175 is closed, which is the normal condition, and the automatic control mechanism 176 is also closed, which is the normal condition therefor. If the temperature in conduit 12 is too cold the thermostat valve mechanism 261 is closed and therefore prevents flow of air through the temperature trim adjustment orifice 253. As the pressures on opposite sides of the diaphragm 190 are, under these conditions, substantially equal, the valve 222 is in the closed position under the influence of spring 223.

As the pressure in the controller system builds up with the closing of the dump valve there is a pressure increase in the chamber 103 of the bypass valve mechanism 37 so as to move the valve 112 upwardly to connect conduits 137 and 138 together and to provide a pressure rise in chamber 98 which will effect downward movement of diaphragm 86 and opening movement of the valve 80 in the bypass 24. As the bypass valve 80 opens to provide flow of hot air around the heat exchanger 16 and turbine 18 the temperature in the conduit 12 increases. As the temperature in conduit 12 increases the thermostat valve 269 will open when the set temperature has been reached. Under this condition a flow of air is effected across the temperature trim adjustment orifice 253 thereby creating a pressure differential across the automatic control or the temperature control relay diaphragm 190 which will effect opening movement of the valve member 222 which reduces the pressure in the controller system so that the bypass valve member 112 reduces the pressure transmitted to the chamber 98 and spring 92 will cause the bypass valve 80 to throttle. The thermostat mechanism 261 will then control the position of the bypass valve so as to maintain the required temperature in the system and in the cabin.

Temperature adjustment is effected by rotating the knob 247 clockwise to a maximum of 100° or other preselected temperature, such adjustment being effected by the change in the loading of the spring 228 upon rotation of said knob which causes a counterclockwise movement of lever 212. With the counterclockwise movement of lever 212 the compression of spring 228 is not only increased but the pressure of spring 210 on diaphragm 189 is decreased. As the knob 247 is rotated clockwise the lever 212 is rotated counterclockwise and increases the spring loading on the diaphragm 190 which, in turn, therefore requires greater pressure differential to effect metering by the valve 222 and increase the flow through the temperature trim adjustment orifice 253. Therefore, a higher temperature is required such as will cause the thermostat valve 269 to open further. When the pointer 250 is turned clockwise to the 100° point spring 228 is fully collapsed and a direct override of the metering system is effected to thereby insure complete elimination of the automatic control.

The temperature trim adjustment valve 254 is the means used to set the initial temperature of 40° on the dial. At the point where the automatic temperature control is locked out of the system the manual control mechanism 175 takes effect commencing with the manual hot position indicated on the dial in FIG. 2. The mnaual control mechanism spring 210 is normally loaded to a value higher than the maximum control pressure required for the bypass valve mechanism 37. At the point of take over the manual control mechanism 175 is at the point of operation within the control pressure range of the bypass valve mechanism 37. Further rotation of the knob 247 in the clockwise direction will decrease the loading of spring 210 on diaphragm 189 thereby permitting the diaphragm 189 to move upwardly and allow escape of air from the controller pressure system. This decrease of pressure in the controller pressure system will result in closing movement of the valves 80 and 60 to reduce the amount of hot air entering the system. At full cold, the spring load on diaphragm 189 has been reduced to the point whereat the bypass valve 80 will be closed so that all the hot air entering the system will pass through the heat exchanger 16 and the turbine 18.

I claim:

1. A controller for an air conditioning and temperature control system for enclosures having an inlet duct and a hot air conduit for conducting hot air to said inlet duct; a heat exchanger having an inlet connected with said conduit and having an outlet for said air; a cooling turbine having an inlet connected with the outlet of said heat exchanger and having an outlet connected with said enclosure; a hot air bypass about said heat exchanger and said turbine; means connected with said heat exchanger for supplying cooling air thereto; a cold air bypass about said heat exchanger, said bypass being connected to said hot air bypass; means, including pressure responsive means, for controlling the flow of air through said cold air bypass; means, including pressure responsive means, for controlling the flow of hot air through said hot air conduit; means, including pressure responsive means, for controlling the flow of air through the hot air bypass; pressure responsive regulating means for regulating the supply of air to the pressure responsive means of the hot air bypass control means; temperature responsive means for modulating the action of the hot air bypass control means; means operably associated with said temperature responsive means for limiting the rate of temperature change in the system; an operating pressure system including means for connecting to a source of operating pressure the various pressure responsive means for the control for the hot air conduit, the control means for the cold air bypass, the control means for the hot air bypass, and the pressure responsive regulating means, the improvement comprising: means for controlling the pressure in said operating pressure system including dump valve means; pressure responsive manual control means; pressure responsive automatic control means for controlling the escape of air from said operating pressure system; manually operable selective control means connected with said dump valve means, manual control means and automatic control means for selective activation and inactivation thereof; and means for controlling said automatic control means in accordance with temperature of a selected location, including an orifice controlling the flow of air from said operating pressure system to the pressure responsive automatic control means; and temperature responsive means controlling the flow of said air to a low pressure region.

2. In a controller for air conditioning and temperature control system for an enclosure having an air ram for supplying air under pressure thereto; a casing having a chamber vented to atmosphere and a second chamber for connection with pneumatically actuated mechanisms; a dump passage connecting said chambers together; a normally closed dump valve including a spring loaded movable dump valve member controlling said dump passage; manual control means including a fixed valve member, a pressure responsive element having an opening therethrough controlled by said valve member, said pressure responsive element being responsive to variations in the differential of pressure between said chambers; yielding means yieldingly urging the pressure responsive element in a direction to effect closing of the opening therethrough by said valve member; automatic control means including a second passage connecting said chambers together; a valve member controlling said second passage, said casing having a third chamber; pressure responsive means controlling said last mentioned valve member and responsive to variations in the differential of pressure between the second and third chambers; yielding means adapted to urge the pressure responsive means in a direction to effect movement of the last named valve member in the closing direction; a lever pivotally mounted intermediate the ends thereof, said lever being connected adjacent one end to said dump valve and being connected with the first mentioned yielding means between the pivot and the connection with said dump valve, and being connected adjacent the opposite end with the yielding means of said automatic control means; manually adjustable means for actuating said lever on said pivot to control said dump valve and to vary the effective force of the respective yielding means on said pressure responsive element and said pressure responsive means to thereby control the functioning of said manual control means and said automatic control means, said manually adjustable means including an adjusting knob having a pointer and a dial having markings including a ram air only position, automatic control positions and manual control positions; passage means between the second and third chambers, including a trim orifice; an adjustable valve member for said orifice to provide adjustable trim means; a conduit connecting the third chamber with ambient atmosphere; and temperature responsive means for controlling said conduit.

3. In a controller for an air conditioning and temperature control system for an enclosure: a casing having a chamber vented to atmosphere and a second chamber for connection with pneumatically actuated mechanisms; a dump passage connecting said chambers together; a normally closed dump valve including a spring loaded movable dump valve member controlling said dump passage; manual control means including a fixed valve member, a pressure responsive element having an opening therethrough controlled by said valve member, said pressure responsive element being responsive to variations in the differential of pressure between said chambers; yielding means for yieldingly urging the pressure responsive element in a direction to effect closing of the opening therethrough by said valve member; automatic control means including a second passage connecting said chambers together; a valve member controlling said second passage, said casing having a third chamber; pressure responsive means controlling said last mentioned valve member and responsive to variations in the differential of pressure between the second and third chambers; yielding means adapted to urge the pressure responsive means in a direction to effect movement of the last named valve member in the closing direction; a lever pivotally mounted intermediate the ends thereof, said lever being connected adjacent one end to said dump valve and being connected with the first mentioned yielding means between the pivot and the connection with said dump valve, and being connected adjacent the opposite end with the yielding means of said automatic control means; manually adjustable means for adjusting said level on said pivot to control said dump valve and to vary the effective force of the respective yielding means on said pressure responsive element and said pressure responsive means to thereby control the functioning of said manual control means and said automatic control means, said manually adjustable means including an adjusting knob having a pointer and a dial having markings including a ram air only position whereat the dump valve is open, automatic control positions and manual control positions, the yielding means of said automatic control means being fully compressed when said manually adjustable means is at the manual control position; passage means between the second and third chambers, including an adjustable orifice; a conduit connecting the third chamber with ambient atmosphere; and temperature responsive means for controlling said conduit.

4. In a controller for an air conditioning and temperaturn control system for an enclosure adapted to be supplied with air by means of a ram; a casing having a chamber vented to atmosphere and a second chamber for connection with pneumatically actuated mechanisms; a dump passage connecting said chambers together; a normally closed dump valve including a spring loaded movable dump valve member controlling said dump passage; manual control means including a fixed valve member, a pressure responsive element having an opening therethrough controlled by said valve member, said pressure responsive element being responsive to variations in the differential of pressure between said chambers; yielding means for yieldingly urging the pressure responsive element in a direction to effect closing of the opening therethrough by said valve member; automatic control means including a second passage connecting said chambers together; a valve member controlling said second passage, said casing having a third chamber; pressure responsive means controlling said last mentioned valve member and responsive to variations in the differential of pressure between the second and third chambers; yielding means adapted to urge the pressure responsive means in a direction to effect movement of the last named valve member in the closing direction; an adjusting member, said adjusting member being connected with said dump valve, with the first mentioned yielding means, and with the yielding means of said automatic control means; adjustable means for adjusting said adjusting member to control said dump valve and to vary the effective force of the respective yielding means on said pressure responsive element and said pressure responsive means to thereby control the functioning of said manual control means and said automatic control means, said adjustable means including an adjusting knob and a dial with which said knob is cooperable, there being a ram air only position, automatic control positions and manual control positions; a connection between the second and third chambers, said connection including a calibrated orifice; an adjustable valve member for said orifice; a conduit connecting the third chamber with ambient atmosphere; and temperature responsive means for controlling said conduit.

5. In a controller for an air conditioning and temperature control system for an enclosure adapted to be supplied with air by means of a ram: a casing having a chamber vented to atmosphere and a second chamber for connection with pneumatically actuated mechanisms; a dump passage connecting said chambers together; a normally closed dump valve including a spring loaded movable dump valve member controlling said dump passage; manual control means including a fixed valve member, a pressure responsive element having an opening therethrough controlled by said valve member, said pressure responsive element being responsive to variations in the differential of pressure between said chambers; yielding means for yieldingly urging the pressure responsive element in a direction to effect closing of the opening therethrough by said valve member; automatic control means including a second passage connecting said chambers together; a valve member controlling said second passage, said casing having a third chamber; pressure responsive means controlling said last mentioned valve member and responsive to variations in the differential of pressure between the second and third chambers; yielding means adapted to urge the pressure responsive means in a direction to effect movement of the last named valve member in the closing direction; an adjusting member, said adjusting member being connected with said dump valve, with the first mentioned yielding means, and with the yielding means of said automatic control means; adjustable means for adjusting said adjusting member to control said dump valve and to vary the effective force of the respective yielding means on said pressure responsive element and said pressure responsive means to thereby control the functioning of said manual control means and said automatic control means, said adjustable means including an adjusting knob and a dial with which said knob is cooperable, there being a ram air only position, automatic control positions and manual control positions; a calibrated connection between said second and third chambers; a conduit connecting the third chamber with ambient atmosphere; and temperature responsive means for controlling said conduit.

6. In a controller for an air conditioning and temperature control system for an enclosure adapted to be supplied with air by means of a ram; means defining first, second and third chambers; the first chamber being vented to atmosphere, the second chamber being adapted to be connected with pneumatically actuated mechanisms; a dump passage connecting the first and second chambers together; normally closed spring loaded dump valve controlling said dump passage; manual control means including a second connection between the first and second chambers; valve means controlling said connection including a pressure responsive element responsive to variations in the differential of pressure between said first and second chambers; yielding means yieldingly urging the pressure responsive element in the valve closing direction; automatic control means including a third connection between the first and second chambers; valve means controlling said third connection; pressure responsive means controlling the last mentioned valve means, said pressure responsive means being responsive to variations in the differential of pressure between the second and third chambers; yielding means adapted to urge the pressure responsive means in a direction to effect closing of the last named valve means; manually adjustable means for selectively controlling said dump valve, said manual control means and said automatic control means, said manually adjustable means having a ram air only position, automatic control positions and manual control positions; calibrated connecting means between the second and third chambers; and thermal responsive means for controlling the means connecting said third chamber with ambient atmosphere.

7. In a controller for an air conditioning and temperature control system for an enclosure: means defining first, second and third chambers; the first chamber being vented to atmosphere, the second chamber being adapted to be connected with pneumatically actuated mechanisms; a dump passage connecting the first and second chambers together; a normally closed spring loaded dump valve controlling said dump passage; manual control means including a second connection between the first and second chambers; valve means controlling said connection including a pressure responsive element responsive to variations in the differential of pressure between said first and second chambers; automatic control means including a third connection between the first and second chambers; valve means controlling said third connection; pressure responsive means controlling the last mentioned valve means, said pressure responsive means being responsive to variations in the differential of pressure between the second and third chambers; manually adjustable means for selectively controlling said dump valve, said manual control means and said automatic control means; calibrated connecting means between the second and third chambers; means connecting the third chamber with a low pressure region; and temperature responsive means for controlling the means connecting said third chamber with said low pressure region.

8. In a controller for an operating pressure control system for pressure controlled mechanisms in an air conditioning and temperature control system: pressure dump means including a normally closed dump valve controlling escape of air from said pressure control system to a low pressure region; manual control means for controlling escape of air from said pressure control system to said low pressure region; automatic control means for controlling the escape of air from said pressure control system to said low pressure region, said automatic control means including pressure and temperature responsive parts, said pressure responsive parts being subjected on one side to the pressure in said operating pressure control system; and manually adjustable means connected to said dump valve, automatic control means and manual control means for controlling said dump valve, said manual control means and said automatic control means and selectively rendering the same operative and inoperative.

9. In a controller for controlling the fluid pressure in a fluid pressure operated control system: pressure dump means in fluid communication with said fluid pressure operated control system including a normally closed dump valve controlling the escape of air from said system to a low pressure region; manual control means in fluid communication with said fluid pressure control system for controlling the escape of air from said system to a low pressure region; automatic control means in fluid communication with said fluid pressure control system for controlling the escape of air from said system to a low pressure region, said automatic means including a pressure responsive element subjected on one side to the pressure in said system, means defining a fluid pressure chamber having a bleed connection with said system, said pressure responsive element being subjected on its other side to the pressure in said chamber, and temperature responsive means controlling the escape of fluid pressure from said chamber; and means for selectively rendering operative to control the pressure in said system, the manual control means, the automatic controll means, or said dump means.

10. In a controller for controlling the operating pressure of pressure actuated means: automatic control means for controlling said operating pressure, said automatic control means including pressure responsive means and temperature responsive means, said pressure responsive means having a movable wall subjected on one side to said operating pressure and subjected on the opposite side to a modified pressure and operating in response to variations in the differential of pressure thereacross, said temperature responsive means controlling the modified pressure; and manual control means including a pressure responsive element subjected on one side to said operating pressure and adapted to control the pressure in said system when said automatic control means is rendered inoperative, said manual control means including means for rendering said automatic control means inoperative when said manual control means is operative.

11. In a controller for an operating pressure control system for pressure controlled mechanisms in an air conditioning and temperature control system: pressure dump means operably connected with said pressure control system and including a normally closed dump valve controlling escape of air to a low pressure region; manual control means operably connected with said pressure control system for controlling escape of air to said low pressure region; automatic control means operably connected with said pressure control system for controlling the escape of air to said low pressure region, said automatic control means including a pressure responsive element subjected on one side to said operating pressure, means defining a chamber at the opposite side of said element, there being a bleed connection bleeding operating pressure into said chamber, and temperature responsive means for controlling the pressure in said chamber; and manually adjustable means for selectively rendering operative and inoperative respectively said dump valve, said manual control means, and said automatic control means.

12. In a controller for controlling the operating pressure of fluid pressure actuated means; manual control means, including a pressure responsive element subjected on one side to the operating pressure, controlling the value of said operating pressure; automatic control means, including pressure responsive means and temperature responsive means, for cooperatively controlling the value of the operating pressure, said pressure responsive means being subjected on one side to said operating pressure and on the other side to a variable pressure controlled by said temperature responsive means; pressure dump means for controlling the value of said operating pressure; and means for selectively controlling said manual control means, said automatic control means and said dump means.

13. In a controller for controlling the operating pressure of pressure actuated means: manual control means communicating with the operating pressure for controlling same, said manual control means including a pressure responsive element subjected on one side to operating pressure; automatic control means for controlling the operating pressure, said automatic control means including pressure responsive means subjected on one side to the operating pressure, and temperature responsive means for controlling the pressure on the opposite side of said pressure responsive means; pressure dump means communicating with said operating pressure for quickly changing its value; and selective control means operably connected to said manual control means, said automatic control means, and said dump means for selectively controlling same, said selective control means closing the dump valve when either the automatic control or the manual control means is operative to control the operating pressure.

14. In a fluid flow system of the type having a valve and a pressure responsive actuator therefor: means for applying fluid under pressure to said actuator to effect the operation of said valve, said means having a control passage receiving pressure fluid from a source at a restricted rate, said pressure responsive actuator communicating with said control passage; a pair of valve communicating with said control passage for bleeding pressure fluid therefrom to change the pressure applied to said actuator and effect a predetermined operation of said valve, one of said bleed valves being thermostatically operated and the other being responsive to fluid pressure; and means for selectively placing either of said bleed valves in primary control of the pressure in said control passage.

15. In a fluid flow system of the type having a valve and a pressure responsive actuator therefor: means for applying fluid under pressure to said actuator to effect the operation of said valve, said means having a control passage receiving pressure fluid from a source at a restricted rate, said pressure responsive actuator communicating with said control passage; a pair of valves communicating with said control passage for bleeding pressure fluid therefrom to change the pressure applied to said actuator and effect a predetermined operation of said valve, one of said bleed valves being thermostatically operated and the other being responsive to fluid pressure;

means for selectively placing either of said bleed valves in primary control of the pressure in said control passage; and means for adjusting the bleed valve which is responsive to fluid pressure to vary the pressure at which it will respond.

16. In a fluid flow system of the type having a valve and a pressure responsive actuator therefor: means for applying fluid under pressure to said actuator to effect the operation of said valve, said means having a control passage receiving pressure fluid from a source at a restricted rate, said pressure responsive actuator communicating with said control passage; a pair of valves communicating with said control passage for bleeding pressure fluid therefrom to change the pressure applied to said actuator and effect a predetermined operation of said valve, one of said bleed valves being thermostatically operated and the other being responsive to fluid pressure; means for selectively placing either of said bleed valves in primary control of the pressure in said control passage; and means for adjusting the thermostatically operated bleed valve to change the operating temperature range thereof.

17. In a fluid flow system of the type having a valve and a pressure responsive actuator therefor: means for applying fluid under pressure to said actuator to effect the operation of said valve, said means having a control passage receiving pressure fluid from a source at a restricted rate, said pressure responsive actuator communicating with said control passage; a pair of valves communicating with said control passage for bleeding pressure fluid therefrom to change the pressure applied to said actuator and effect a predetermined operation of said valve, one of said bleed valves being thermostatically operated and the other being responsive to fluid pressure; means for selectively placing either of said bleed valves in primary control of the pressure in said control passage; means for adjusting the bleed valve which is responsive to fluid pressure to vary the pressure at which it will respond; and means for adjusting the thermostatically operated bleed valve to change its operating temperature range.

18. In a fluid flow system of the type having a valve and a pressure responsive actuator therefor: means for applying fluid under pressure to said actuator to effect the operation of said valve, said means having a control passage receiving pressure fluid from a source at a restricted rate, said pressure responsive actuator communicating with said control passage; a pair of valves communicating with said control passage for bleeding pressure fluid therefrom to change the pressure applied to said actuator and effect a predetermined operation of said valve, one of said bleed valves being thermostatically operated and the other being responsive to fluid pressure; means for setting said thermostatically operated bleed valve to operate at a predetermined maximum temperature of the fluid in a portion of the system; and means for adjusting the other bleed valve to vary the pressure at which it will respond.

19. In an air conditioning and temperature control system for enclosures having means for supplying heated air to said enclosure from a source of heated air, means for supplying cooler air to said enclosure from a source of cool air, means for controlling said supplies of air, said means including a plurality of pressure responsive mechanisms operable by a control pressure, the improvement comprising: means adapted for fluid pressure communication with said pressure responsive mechanisms for controlling said mechanisms, said means including dump valve means; pressure responsive manual control means; automatic control means, including pressure responsive and temperature responsive means operably associated therewith for controlling operation thereof, said dump valve means, manual control means and automatic control means being operable independently of each other; and a single control means for manually selecting the dump valve means, manual control means or automatic control means as a control for said mechanisms.

20. In a controller for an air conditioning and temperature control system for an enclosure having means for supplying heated air to said enclosure from a source of heated air, means for supplying cooler air to said enclosure from a source of cool air, and means for controlling said supplies of air, including a plurality of pressure responsive mechanisms, said controller being characterized by: means adapted to be connected in fluid pressure communication with said pressure responsive mechanisms for controlling said mechanisms, including dump valve means; pressure responsive manual control means adapted to be connected in fluid pressure communication with said pressure responsive mechanisms; automatic control means including pressure responsive and temperature responsive means, said dump valve means, manual control means and automatic control means being selectively operable independently of each other for regulating pressure to said pressure responsive means; and control means for manually selecting the dump valve means, manual control means or automatic control means as a control for said mechanisms.

21. In an enclosure air conditioning apparatus of the type having an inlet for conditioned air and separate branch inlets for refrigerated, warm, and ambient atmospheric air communicating with said inlet, said branch inlets having valve means with actuators responsive to a control fluid pressure for governing air flow through said branch inlets, a control device for said apparatus characterized by: a casing forming a control pressure chamber adapted to be connected with the actuators for such valve means; a plurality of fluid pressure responsive valves adapted to be connected with said control fluid pressure, said valves having valve elements adapted to control the pressure in said control pressure chamber; and means adapted for the adjustment of the responsiveness of certain of said valve elements to vary the pressures at which they will operate.

22. In an enclosure air conditioning apparatus of the type having an inlet for conditioned air and separate branch inlets for refrigerated, warm, and ambient atmospheric air communicating with said inlet, said branch inlets having valve means with actuators responsive to control fluid pressure for governing air flow through said branch inlets, and a control device characterized by: a casing forming a control pressure chamber for a control pressure, said chamber being adapted to be connected with the actuators for such valves; a plurality of fluid pressure responsive valve elements connected with said control pressure chamber for controlling the pressure in said pressure chamber; and means for rendering a selected fluid pressure responsive valve element operative to control the pressure in said control pressure chamber while the other fluid pressure responsive valve elements are rendered inoperative.

23. In an enclosure air conditioning apparatus of the type having an inlet for conditioned air and separate branch inlets for refrigerated, warm, and ambient atmospheric air communicating with said inlet, said branch inlets having valve means with actuators responsive to control fluid pressure for governing air flow through said branch inlets, and a control device characterized by: a casing forming a control pressure chamber adapted to communicate with the actuators for such valves; a plurality of fluid pressure responsive valve elements connected with said control pressure chamber and subjected on one side to the pressure in said chamber for controlling the pressure in said control pressure chamber; means for rendering a selected fluid pressure responsive valve element operative to control the pressure in said control pressure chamber while the other fluid pressure responsive valve elements are rendered inoperative, and thermostatic means responsive to the temperatures of conditioned air being supplied to the enclosure to effect the operation of the selected fluid pressure responsive valve element.

24. In an enclosure air conditioning apparatus of the type having an inlet for conditioned air and separate branch inlets for refrigerated, warm, and ambient atmospheric air communicating with said inlet, said branch inlets having valve means with actuators responsive to control fluid pressure for governing air flow through said branch inlets, a control device characterized by: a casing forming a control pressure chamber adapted to be connected with said actuators; a dump valve communicating with said chamber for venting said control pressure chamber and the actuators when connected therewith; pressure responsive valve means in fluid communication with said control pressure chamber for automatically controlling the pressure in said control pressure chamber and said actuators when connected therewith; and manually actuated means for selectively rendering either said dump valve or said pressure responsive valve means operative and the other inoperative.

25. In an enclosure air conditioning apparatus of the type having an inlet for conditioned air and separate branch inlets for refrigerated, warm, and ambient atmospheric air communicating with said inlet, said branch inlets having valve means with actuators responsive to control fluid pressure for governing air flow through said branch inlets, a control device comprising: a casing forming a control pressure chamber adapted to be connected with the actuators for such valves; a dump valve in fluid communication with said control fluid pressure for venting said control pressure chamber and the actuators when connected with said control pressure chamber; pressure responsive valve means adapted to be subjected to control fluid pressure for automatically controlling the pressure in said control pressure chamber and the actuators when connected therewith; manually actuated means for selectively rendering either said dump valve or said pressure responsive valve means operative and the other inoperative; means for controlling said pressure responsive valve means in accordance with the temperature of a selected location, said means having an orifice for bleeding pressure fluid from said pressure responsive valve means; and temperature responsive means for opening and closing said orifice.

26. In an enclosure air conditioning apparatus of the type having an inlet for conditioned air and separate branch inlets for refrigerated, warm, and ambient atmospheric air communicating with said inlet, said branch inlets having valve means with actuators responsive to control fluid pressure for governing air flow through said branch inlets, a control device comprising: a casing forming a control pressure chamber adapted to be in communication with said actuators; a plurality of valves connected with said control pressure chamber for controlling the pressure in said control pressure chamber, at least two of said valves being responsive to fluid pressure in said chamber; manually operated means for mechanically actuating another of said valves to vent said control pressure chamber; means actuated by said manually operated means for selectively rendering certain of said fluid pressure responsive valves operative and the other inoperative; and temperature responsive means for controlling the operation of the selected valve in accordance with the temperature of a predetermined location.

27. In an air conditioning and temperature control system for enclosures wherein there is means for supplying heated air to said enclosure from a source of heated air, means for supplying cooler air to said enclosure from a source of cool air, and means for controlling said supplies of air, said means including a plurality of pressure responsive mechanisms, characterized by: means adapted for fluid pressure communication with pressure responsive mechanisms of said air conditioning and temperature control system for controlling said mechanisms, said means including dump valve means; automatic control means including pressure responsive means and temperature responsive means adapted for operable connection with said air conditioning and temperature control system, pressure responsive manual control means adapted for fluid pressure connection with said pressure responsive mechanisms of said air conditioning and temperature control system for control of the pressure response characteristic of said automatic control means; and manually operable selective control for rendering operable or inoperable to respectively control the operation of the pressure responsive mechanisms, the dump valve means, manual control means and automatic control means.

References Cited in the file of this patent
UNITED STATES PATENTS

| | | |
|---|---|---|
| 2,202,485 | Fitch | May 28, 1940 |
| 2,372,393 | Ray | Mar. 27, 1945 |
| 2,412,071 | Warner et al. | Dec. 3, 1946 |
| 2,451,280 | Del Mar | Oct. 12, 1948 |
| 2,678,542 | Stanton | May 18, 1954 |
| 2,925,255 | Shaw | Feb. 16, 1960 |

UNITED STATES PATENT OFFICE
CERTIFICATE OF CORRECTION

Patent No. 3,126,947                      March 31, 1964

Raymond W. Jensen

It is hereby certified that error appears in the above numbered patent requiring correction and that the said Letters Patent should read as corrected below.

Column 4, line 40, before "secured" insert -- is --; line 49, for "pressure" read -- pressures --; line 50, for "subject" read -- subjected --; column 5, lines 49 and 50, for "temperatiure" read -- temperature --; column 8, line 5, after "prevailing" insert -- in --; line 16, for "counterlockwise" read -- counterclockwise --; column 9, line 16, for "mnaual" read -- manual --; column 11, line 4, for "level" read -- lever --; column 12, line 35, before "normally" insert -- a --; column 14, line 55, for "valve" read -- valves --.

Signed and sealed this 18th day of August 1964.

(SEAL)
Attest:

ERNEST W. SWIDER
Attesting Officer

EDWARD J. BRENNER
Commissioner of Patents